United States Patent [19]
Madduri

[11] Patent Number: 5,526,524
[45] Date of Patent: Jun. 11, 1996

[54] METHOD AND SYSTEM FOR MANAGEMENT OF LOCKED OBJECTS IN A COMPUTER SUPPORTED COOPERATIVE WORK ENVIRONMENT

[75] Inventor: Hari H. Madduri, Austin, Tex.

[73] Assignee: International Business Machines Corporation, Armonk, N.Y.

[21] Appl. No.: 173,307

[22] Filed: Dec. 23, 1993

[51] Int. Cl.⁶ .................................................. G06F 13/14
[52] U.S. Cl. ................................. 395/726; 395/650
[58] Field of Search ................................ 395/650, 700, 395/726

[56] References Cited

U.S. PATENT DOCUMENTS

| | | | |
|---|---|---|---|
| 4,399,504 | 8/1983 | Obermarck et al. | 364/200 |
| 4,574,350 | 3/1986 | Starr | 364/200 |
| 4,587,609 | 5/1986 | Boudreau et al. | 364/200 |
| 4,604,694 | 8/1986 | Hough | 364/200 |
| 4,665,484 | 5/1987 | Nanba | 364/200 |
| 4,965,719 | 10/1990 | Shoens et al. | 364/200 |
| 5,285,528 | 2/1994 | Hart | 395/725 |
| 5,339,427 | 8/1994 | Elko et al. | 395/725 |
| 5,388,268 | 2/1995 | Beach et al. | 395/700 |
| 5,414,839 | 5/1995 | Joshi | 395/600 |
| 5,418,966 | 5/1995 | Madduri | 395/725 |
| 5,440,746 | 8/1995 | Lentz | 395/163 |
| 5,459,871 | 10/1995 | Van Den Berg | 395/650 |

*Primary Examiner*—Kevin A. Kriess
*Attorney, Agent, or Firm*—Jeffrey S. LaBaw; Andrew J. Dillon

[57] ABSTRACT

A method and system for efficiently managing access to multiple objects which are stored within a distributed data processing system wherein access to those objects may be selectively locked by one of the users enrolled within the distributed data processing system. Each time access to an object within the distributed data processing system is attempted, the lock status of that object is determined. If access to the object is not locked, access is granted to the requesting user. However, if access to the object is currently locked, the identity of each requesting user is stored within a "camp-on" table within the distributed data processing system. Next, the lock status of the object is determined. This may be accomplished by detecting the release of an object by a user who has previously locked that object or by periodically checking the lock status of all objects. When the lock status changes, an audible or visual notification is automatically transmitted to each user who has requested access to that object, greatly enhancing the efficiency of access management to objects stored within a distributed data processing system.

6 Claims, 3 Drawing Sheets

CAMP-ON TABLE OBJECT NO. 1234 — 40

| USER ID | ADDRESS |
|---|---|
| SMITH | ABCVM1 |
| JONES | CDEVM2 |
| WILLIAMS | ABCVM2 |
| JOHNSON | XYZVMP |
|  |  |
|  |  |
|  |  |
|  |  |
|  |  |
|  |  |

42 — USER ID    44 — ADDRESS

METHOD AND SYSTEM FOR MANAGEMENT OF LOCKED OBJECTS IN A COMPUTER SUPPORTED COOPERATIVE WORK ENVIRONMENT

BACKGROUND OF THE INVENTION

1. Technical Field

The present invention relates in general to an improved data processing system and in particular to an improved method for managing access to a plurality of objects stored within a distributed data processing system. Still more particularly, the present invention relates to an improved method and system for controlling access to objects stored within a distributed data processing system wherein access to those objects may be selectively locked by users within the distributed data processing system.

2. Description of the Related Art

Data processing systems are becoming increasingly widespread in their application and use within the work environment. As the technology of these systems increases, the number of users and the complexity of applications which may be utilized within such systems has also increased.

One area in which distributed data processing systems have promoted efficiency in the work place is the ability of such systems to permit multiple users to access a single document, application or resource. Such systems typically operate utilizing one of two techniques. In a collaborative computer system, a real-time computer based environment is provided for coordinating individual efforts toward completion of a task. The task or the subject of a group's attention may be a document, a production schedule, a computer program, a product design, or a still or full motion video image or other multimedia selected tasks, solution of which is represented by the organized expression of information. The construction of that expression is presumed to be aided by the efforts of more than one person and particularly by the simultaneous efforts of more than one person.

In many collaborative systems concurrent access to objects within the system is permitted by each of a plurality of users. This issue raises a number of subsidiary issues. For example, user access may be limited to the ability to read an object, but more commonly includes some rights to manipulate or change the object. Such access is typically provided through a multiuser interface which generally includes a video monitor under the control of the user's local workstation, through which views of the shared data object are displayed. In a strict collaborative system, each user displays the exact same subject matter from the same viewpoint and each user is given apparent immediate rights to manipulate the shared object. Such systems often give rise to conflicts or collisions within the system based upon user actions, such as simultaneous attempts to change the same word in a word processing document.

In a more simplified system, typically referred to as a Computer Supported Cooperative Work (CSCW) environment, multiple users may attempt to access the same document at the same time and selected users may be permitted to "lock" the document for some period of time, permitting that user to have exclusive access to the document. During the period of time when a first user has a document restricted by a "lock" other users wishing to use that document will be told that the resource is "locked" and thus their attempt at accessing the document will be thwarted. The efficiency of a user within a CSCW system is thus diminished by a requirement that the user periodically check back to determine whether or not the document or object to which access is desired is available.

It should therefore be apparent that a need exists for a system which may be utilized to identify changes in the lock status of an object within a Computer Supported Cooperative Work (CSCW) system, and to efficiently inform those users interested in access to an object that the lock status of an object has changed.

SUMMARY OF THE INVENTION

It is therefore one object of the present invention to provide an improved data processing system.

It is another object of the present invention to provide an improved method for managing access to a plurality of objects stored within a distributed data processing system.

It is yet another object of the present invention to provide an improved method and system for controlling access to objects stored within a distributed data processing system wherein access to those objects may be selectively locked by other users within the distributed data processing system.

The foregoing objects are achieved as is now described. The method and system of the present invention may be utilized to efficiently manage access to multiple objects which are stored within a distributed data processing system wherein access to those objects may be selectively locked by one of the users enrolled within the distributed data processing system. Each time access to an object within the distributed data processing system is attempted, the lock status of that object is determined. If access to the object is not locked, access is granted to the requesting user. However, if access to the object is currently locked, the identity of each requesting user is stored within a "camp-on" table within the distributed data processing system. Next, the lock status Of the object is determined. This may be accomplished by detecting the release of an object by a user who has previously locked that object or by periodically checking the lock status of all objects. When the lock status changes, an audible or visual notification is automatically transmitted to each user who has requested access to that object, greatly enhancing the efficiency of access management to objects stored within a distributed data processing system.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 2 depicts a pictorial representation of a "camp-on" table associated with an object within the distributed data processing system of FIG. 1 which may be utilized for access management within a distributed data processing system in accordance with the method and system of the present invention;

DETAILED DESCRIPTION OF PREFERRED EMBODIMENT

Figure 1:
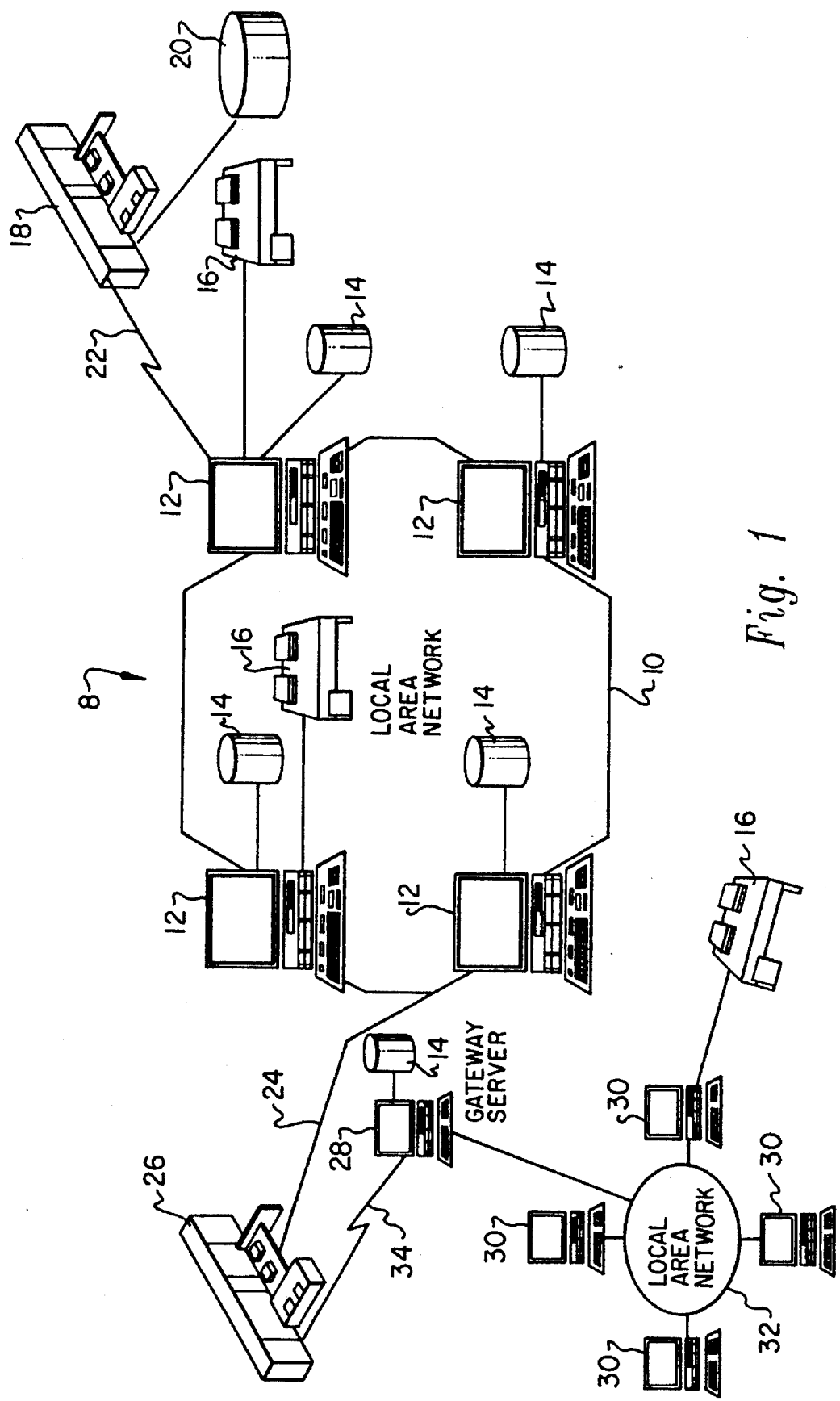
FIG. 1 depicts a pictorial representation of a distributed data processing system which may be utilized to implement the method and system of the present invention.

With reference now to the figures and in particular with reference to FIG. 1, there is depicted a pictorial representation of a distributed data processing system 8 which may be utilized to implement the method and system of the present invention. As may be seen, distributed data processing system 8 may include a plurality of networks, such as Local Area Networks (LAN) 10 and 32, each of which preferably includes a plurality of individual computers 12 and 30, respectively. Of course, those skilled in the art will appreciate that a plurality of Intelligent Work Stations (IWS) coupled to a host processor may be utilized for each such network.

As is common is such data processing systems, each individual computer may be coupled to a storage device 14 and/or a printer/output device 16. One or more such storage devices 14 may be utilized, in accordance with the method of the present invention, to store the various data objects or documents which may be periodically accessed and processed by a user within distributed data processing system 8, in accordance with the method and system of the present invention. In a manner well known in the prior art, each such data processing procedure or document may be stored within a storage device 14 which is associated with a Resource Manager or Library Service, which is responsible for maintaining and updating all resource objects associated therewith.

Still referring to FIG. 1, it may be seen that distributed data processing system 8 may also include multiple mainframe computers, such as mainframe computer 18, which may be preferably coupled to Local Area Network (LAN) 10 by means of communications link 22. Mainframe computer 18 may also be coupled to a storage device 20 which may serve as remote storage for Local Area Network (LAN) 10. A second Local Area Network (LAN) 32 may be coupled to Local Area Network (LAN) 10 via communications controller 26 and communications link 34 to a gateway server 28. Gateway server 28 is preferably an individual computer or Intelligent Work Station (IWS) which serves to link Local Area Network (LAN) 32 to Local Area Network (LAN) 10.

As discussed above with respect to Local Area Network (LAN) 32 and Local Area Network (LAN) 10, a plurality of data processing procedures or documents may be stored within storage device 20 and controlled by mainframe computer 18, as Resource Manager or Library Service for the data processing procedures and documents thus stored.

Of course, those skilled in the art will appreciate that mainframe computer 18 may be located a great geographical distance from Local Area Network (LAN) 10 and similarly Local Area Network (LAN) 10 may be located a substantial distance from Local Area Network (LAN) 32. That is, Local Area Network (LAN) 32 may be located in California while Local Area Network (LAN) 10 may be located within Texas and mainframe computer 18 may be located in New York.

As will be appreciated upon reference to the foregoing, it is often desirable for users within one portion of distributed data processing network 8 to access a data object or document stored in another portion of data processing network 8. In order to maintain a semblance of order within the documents stored within data processing network 8 it is often desirable to implement an access control program. This is generally accomplished by listing those users authorized to access each individual data object or document, along with the level of authority that each user may enjoy with regard to a document within a Resource Manager or Library Service. In this manner, the data processing procedures and documents may be accessed by enrolled users within distributed data processing system 8 and periodically "locked" to prevent access by other users. Referring now to FIG. 2, there is depicted a pictorial representation of a "camp-on" table for a selected object within distributed data processing system 8 of FIG. 1. As described above, each object within distributed data processing system 8 which is accessible by a user enrolled within that distributed data processing system is preferably stored within the system and accessed via a Library Service or Resource Manager which is responsible for controlling access to a group of such objects. The depicted embodiment of the present invention contemplates the management of access to objects within the distributed data processing system in accordance with the method and system of the present invention as implemented utilizing a Resource Manager or Library Service.

In accordance with an important feature of the present invention, each time an attempted access of an object within distributed data processing system 8 is attempted, a determination is made as to whether or not access to that object has been "locked" by another user. The "lock" status of an object, as utilized within the present description, shall mean a determination of whether or not access to a particular object is locked or unlocked. That is, whether or not an enrolled user within distributed data processing system 8 has indicated that access to the object in question is restricted for some selected period of time. In the event an attempted access of an object within distributed data processing system 8 is attempted while that object is locked, an entry is made into a "camp-on" table associated with that object, such as "camp-on" table 40 within FIG. 2.

As illustrated, this table includes two columns. Column 42 is utilized to store an indication of the identification of the user attempting access to the object which is locked. The illustrated embodiment within FIG. 2 simply depicts a textual indication of the user's name; however, those skilled in the art will appreciate that alphanumeric identification codes may also be utilized. Additionally, Column 44 within table 40 stores the electronic address of each such user within distributed data processing system 8. In this manner, a record is created and retained of each user who attempts to access an object within distributed data processing system 8 during a period of time when that object has been locked by another user. The utilization of table 40 of FIG. 2 in the method and system of the present invention will now be illustrated with respect to the description of FIGS. 3 and 4.

Figures 3, 4:
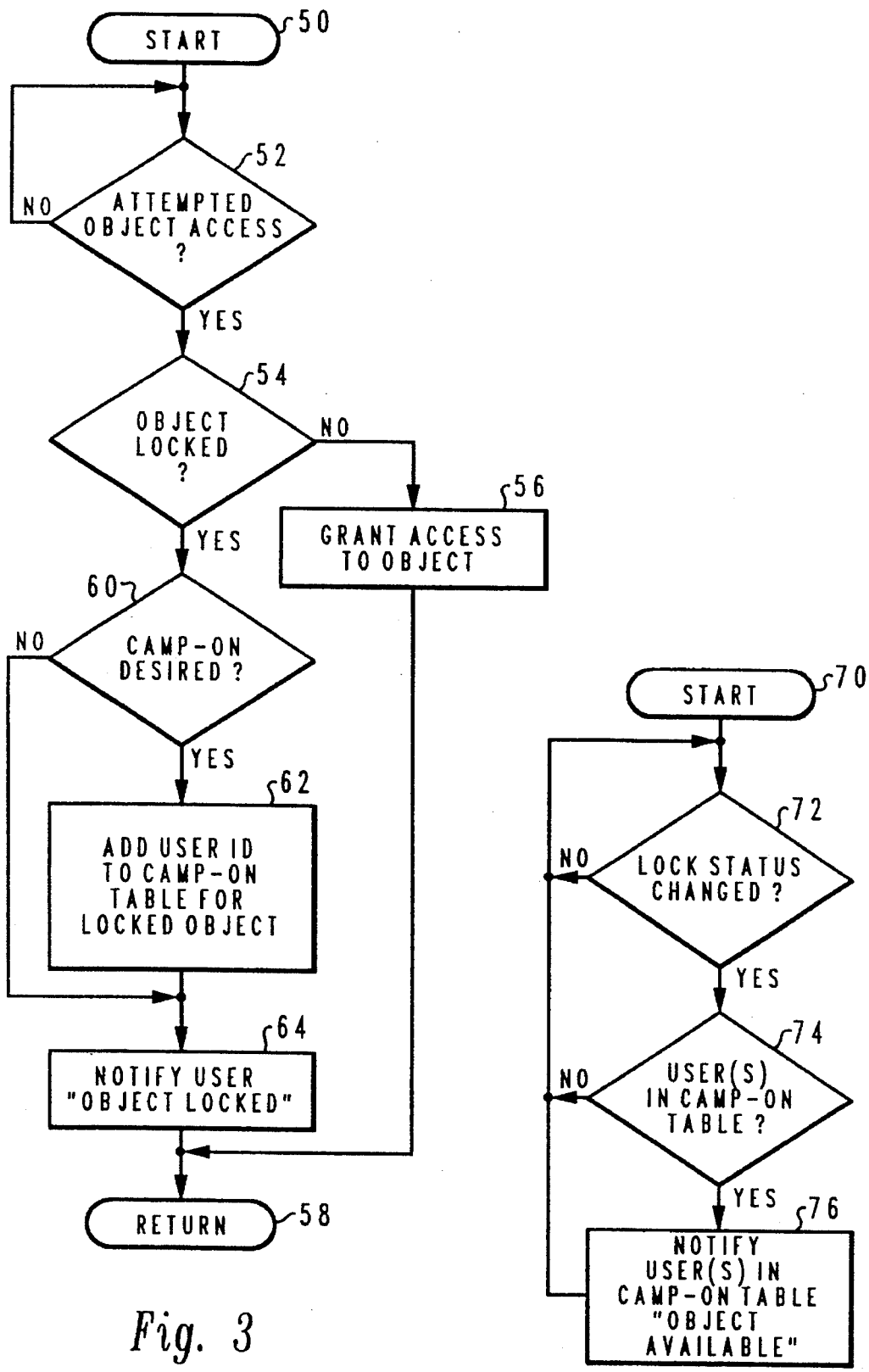
FIG. 3 depicts a high level logic flowchart which illustrates the process undertaken in response to an attempted object access within the distributed data processing system of FIG. 1 in accordance with the method and system of the present invention.
FIG. 4 depicts a high level logic flowchart which illustrates the manner in which a user is notified of a change in the lock status of an object within the distributed data processing system of FIG. 1 in accordance with the method and system of the present invention.

With reference now to FIG. 3, there is depicted a high level logic flowchart which illustrates the management of access to an object within distributed data processing system 8 in accordance with the method and system of the present invention. As illustrated, this process begins at block 50 and thereafter passes to block 52. Block 52 illustrates a determination of whether or not an attempted object access has occurred. If not, the process merely iterates until such time as a user attempts to access an object within a portion of distributed data processing system 8.

Once access to an object within distributed data processing system 8 has been attempted, as determined at block 52, the process passes to block 54. Block 54 illustrates a determination of whether or not the object is "locked," that is, access to that object has been restricted by another user within the data processing system. If not, the process passes to block 56 which depicts the granting of access to that object by the user. Thereafter, the process passes to block 58 and returns, to await a subsequent attempted access of an object within distributed data processing system 8.

Referring again to block 54, in the event the object to which access has been attempted is locked, the process passes to block 60. Block 60 illustrates a determination of whether or not a "camp-on" process is desired by the user attempting the access. Those skilled in the art will appreciate that the desirability of such a process by the user may be indicated during the initial access to an object within distributed data processing system 8 or may be determined by posing a query to the user upon an unsuccessful attempt to access an object within distributed data processing system 8 which has been locked. If the user has indicated, utilizing either method described above, that the "camp-on" feature is not desired, the process passes to block 64. Block 64 illustrates a notification to the user that the object is "locked" and the process then passes to block 58 and returns, to await a subsequent attempted access of an object within distributed data processing system 8.

Referring again to block 60, in the event a "camp-on" feature is desired, the process passes to block 62. Block 62 illustrates the addition of the user identification and address to a "camp-on" table associated with the locked object. Thereafter, the process passes to block 64 which once again illustrates a notification to the user that the object is currently "locked" and the process then passes to block 58 and returns to await a subsequent attempted access of an object within distributed data processing system 8.

Finally, referring to FIG. 4, there is depicted a high level logic flowchart which illustrates the subsequent accessing of a previously locked object in accordance with the method and system of the present invention. As above, the process begins at block 70 and thereafter passes to block 72. Block 72 illustrates a determination of whether or not the lock status of an object within distributed data processing system 8 has changed. By "changed" what is meant is that the lock status has altered from "locked" to "unlocked," indicating that a previous user has removed the "lock" from the object in question and access to that object is no longer prohibited. This may be accomplished by detecting the release of an object by a user who has previously locked that object by periodically checking the lock status of all objects. In the event no lock status has been changed within the system, or within the Library Service or Resource Manager for a group of objects, the process merely iterates until such time as a change in lock status for an object is noted.

Referring again to block 72, once the lock status for an object has changed, the process passes to block 74. Block 74 illustrate a determination of whether or not any users are listed within the "camp-on" table for that object, indicating that a user has attempted to access that object during the period of time when access to that object has been locked by another user. If not, the process returns, in an iterative fashion, to block 72 to await a subsequent change in lock status of an object within this portion of the system.

Still referring to block 74, in the event one or more users are listed within the "camp-on" table associated with the object whose lock status has changed, the process passes to block 76. Block 76 illustrates the notification of all users within the "camp-on" table that the object is available. Those skilled in the art will appreciate that such notification may be implemented utilizing electronic mail messages, or voice annotated messages in a multimedia environment. Further, an iconic representation of the document which is graphically depicted within the display associated with a particular user within distributed data processing system 8 may blink, change color, or produce an audible indication that the object or document requested by the user is now available. Additionally, those skilled in the art will appreciate that a blinking iconic representation may also be utilized to remind the user that he or she is "camped-on" an object within the data processing system. In such a circumstance, the blinking object will preferably change color or shape, or audibly indicate that the resource has become available.

Upon reference to the foregoing those skilled in the art will appreciate that the Applicant in the present application has provided a technique whereby a user within a distributed data processing system may be notified upon the availability of an object within that system which was previously unavailable to the user in an automatic fashion which greatly enhances the efficiency of the management of access to objects within a distributed data processing system.

While the invention has been particularly shown and described with reference to a preferred embodiment, it will be understood by those skilled in the art that various changes in form and detail may be made therein without departing from the spirit and scope of the invention.

I claim:

1. A method in a distributed data processing system having a plurality of objects stored therein to which access may be selectively locked by one of a plurality of users enrolled within said distributed data processing system, for efficiently managing access to said plurality of objects, said method comprising the data processing system implemented steps of:

determining a lock status for an object stored within said distributed data processing system in response to an attempted access of said object by a selected user within said distributed data processing system;

granting access to said object by said selected user in the event access to said selected object is not locked; and in the event access to said object is locked:
 determining if said selected user has requested a "camp-on" for said object;
 notifying said selected user that said object is locked if said selected user has not requested a "camp-on" for said selected object;
 if said selected user has requested a "camp-on" for said selected object:
 storing an identity of said selected user within said distributed data processing system;
 periodically determining a lock status of said object; and
 automatically notifying said selected user within said distributed data processing system in response to a change in lock status of said object by means of a human perceptible indication at a location of said selected user.

2. The method in a distributed data processing system for efficiently managing access to a plurality of objects according to claim 1, wherein said step of storing an identity of said selected user within said distributed data processing system comprises the step of storing an identity for each of a plurality of users within said distributed data processing system in response to an attempt to access said selected object by said plurality of users in the event access to said object is locked.

3. The method in a distributed data processing system for efficiently managing access to a plurality of objects according to claim 2, wherein said step of automatically notifying said selected user in response to a change in lock status of said object comprises the step of automatically notifying each of said plurality of users within said distributed data processing system in response a change in lock status of said object.

4. A system for efficiently controlling access to a plurality of objects stored within a distributed data processing system to which access may be selectively locked by one of a plurality of users enrolled within said distributed data processing system, said system comprising:

means for determining a lock status for an object stored within said distributed data processing system in response to an attempted access of said object by a selected user within said distributed data processing system;

means for granting access to said object by said selected user in the event access to said selected object is not locked;

means for determining if said selected user has requested a "camp-on" for said object in the event access to said selected object is locked means for notifying said selected user that said object is locked in the event said selected user has not requested a "camp-on" for said object;

means for storing an identity of said selected user within said distributed data processing system in the event access to said object is locked and said selected user has requested a "camp-on" for said object;

means for thereafter periodically determining a lock status of said object; and means for automatically notifying said selected user within said distributed data processing system in response to a change in lock status of said object by means of a human perceptible indication at a location of said selected user.

5. The system for efficiently controlling access to a plurality of objects stored within a distributed data processing system to which access may be selectively locked by one of a plurality of users enrolled within said distributed data processing system according to claim 4, wherein said means for storing an identity of said selected user within said distributed data processing system comprises means for storing an identity for each of a plurality of users within said distributed data processing system in response to an attempt to access said selected object by said plurality of users in the event access to said object is locked.

6. The system for efficiently controlling access to a plurality of objects stored within a distributed data processing system to which access may be selectively locked by one of a plurality of users enrolled within said distributed data processing system according to claim 5, wherein said means for automatically notifying said selected user in response to a change in lock status of said object comprises means for notifying each of said plurality of users within said distributed data processing system in response to a change in lock status of said object.

* * * * *

UNITED STATES PATENT AND TRADEMARK OFFICE
CERTIFICATE OF CORRECTION

PATENT NO. : 5,526,524
DATED : June 11, 1996
INVENTOR(S) : Madduri

It is certified that error appears in the above-indentified patent and that said Letters Patent is hereby corrected as shown below:

On the title page, item [54] and column 1, line 2, insert --ACCESS-- before "MANAGEMENT"

Signed and Sealed this

Twenty-ninth Day of October 1996

Attest:

BRUCE LEHMAN

Attesting Officer

Commissioner of Patents and Trademarks